(12) United States Patent
Kubo et al.

(10) Patent No.: US 11,128,848 B2
(45) Date of Patent: Sep. 21, 2021

(54) INFORMATION PROCESSING APPARATUS, METHOD, AND STORAGE MEDIUM

(71) Applicant: CANON KABUSHIKI KAISHA, Tokyo (JP)

(72) Inventors: Hideki Kubo, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/411,777

(22) Filed: May 14, 2019

(65) Prior Publication Data
US 2019/0364252 A1  Nov. 28, 2019

(30) Foreign Application Priority Data

May 25, 2018 (JP) .............................. JP2018-100158

(51) Int. Cl.
*H04N 9/31* (2006.01)
*G03B 33/10* (2006.01)

(52) U.S. Cl.
CPC ........... *H04N 9/3179* (2013.01); *G03B 33/10* (2013.01); *H04N 9/315* (2013.01)

(58) Field of Classification Search
None
See application file for complete search history.

(56) References Cited

U.S. PATENT DOCUMENTS

| 2010/0201705 | A1* | 8/2010 | Takahashi | H04N 1/62 345/600 |
| 2011/0249027 | A1* | 10/2011 | Tsuda | G06F 3/0488 345/634 |
| 2014/0185956 | A1* | 7/2014 | Kawata | G06K 9/40 382/275 |
| 2019/0099060 | A1* | 4/2019 | Yaguchi | G06T 7/0012 |
| 2019/0251663 | A1* | 8/2019 | Yuan | G06T 3/4038 |
| 2019/0340737 | A1* | 11/2019 | Kawaguchi | H04N 5/217 |

FOREIGN PATENT DOCUMENTS

JP 2004-070257 A 3/2004

* cited by examiner

*Primary Examiner* — Talha M Nawaz
(74) *Attorney, Agent, or Firm* — Canon U.S.A., Inc. IP Division

(57) ABSTRACT

An information processing apparatus includes an acquisition unit configured to acquire image data representing an image generated by projecting a first image on a part of a second image using at least one projection apparatus and a control unit configured to control a presentation unit to present, to a user, an area in the second image where the first image is to be projected by the at least one projection apparatus based on the image.

17 Claims, 8 Drawing Sheets

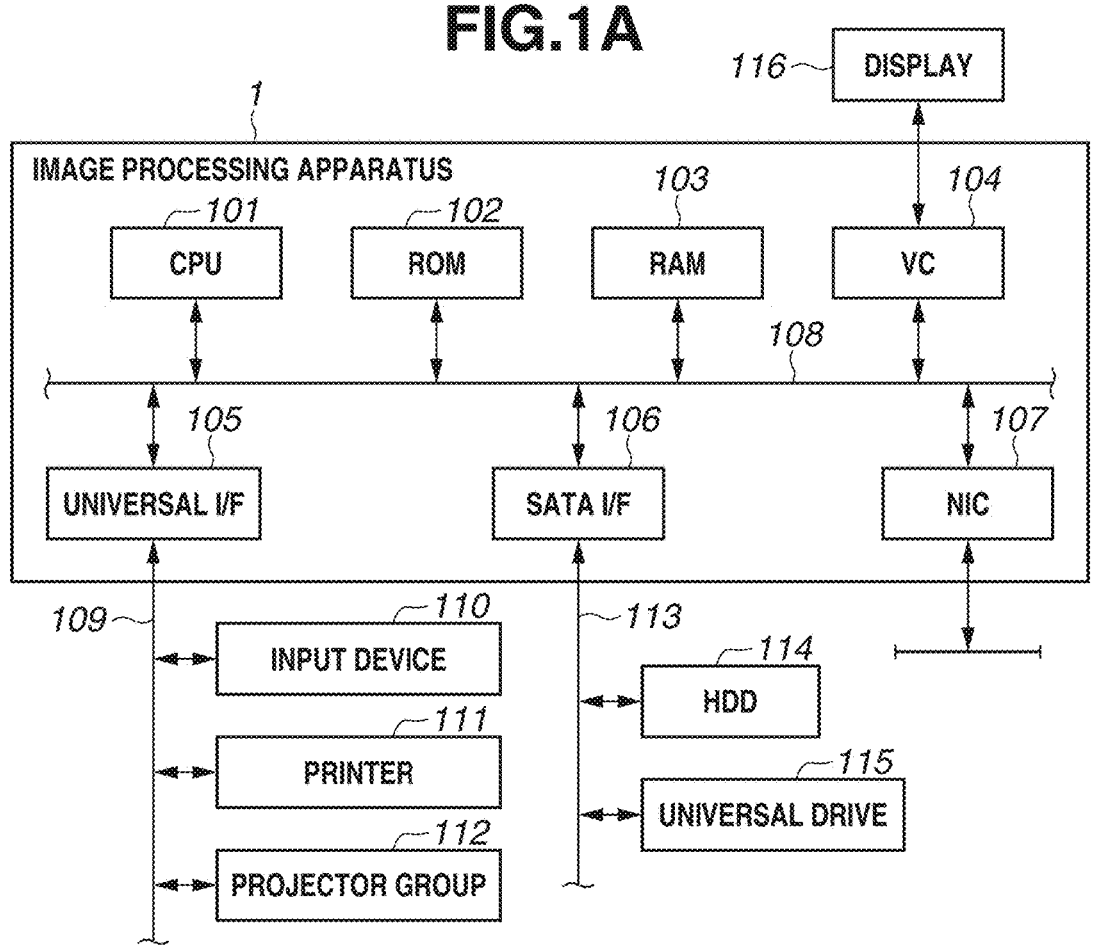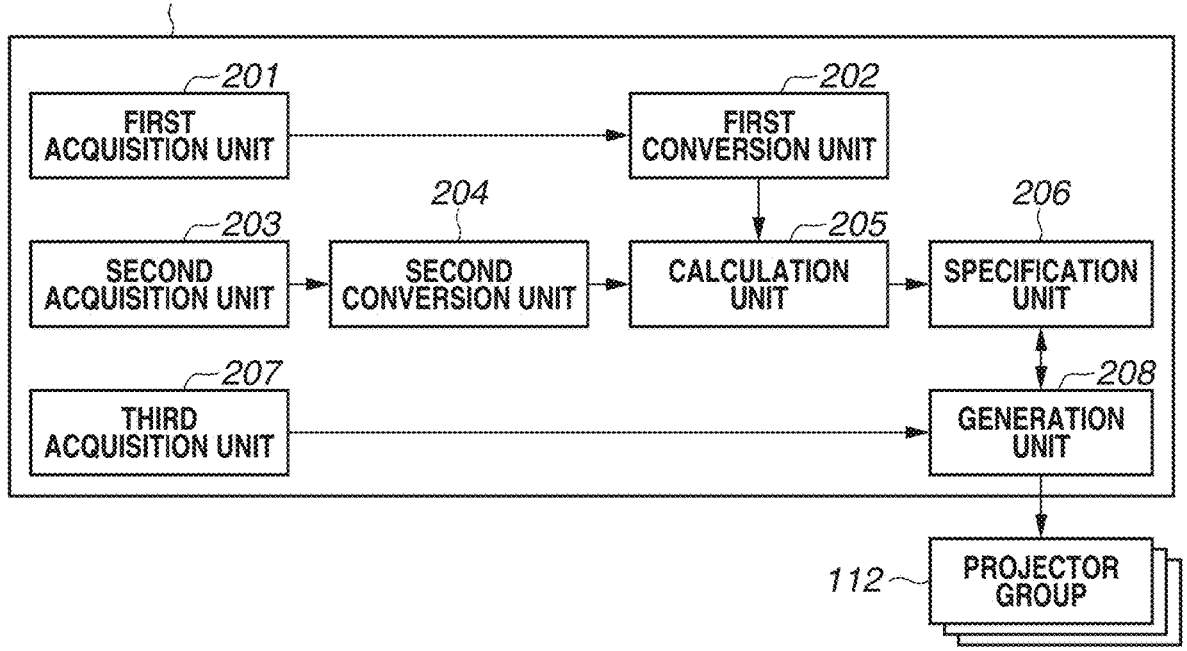

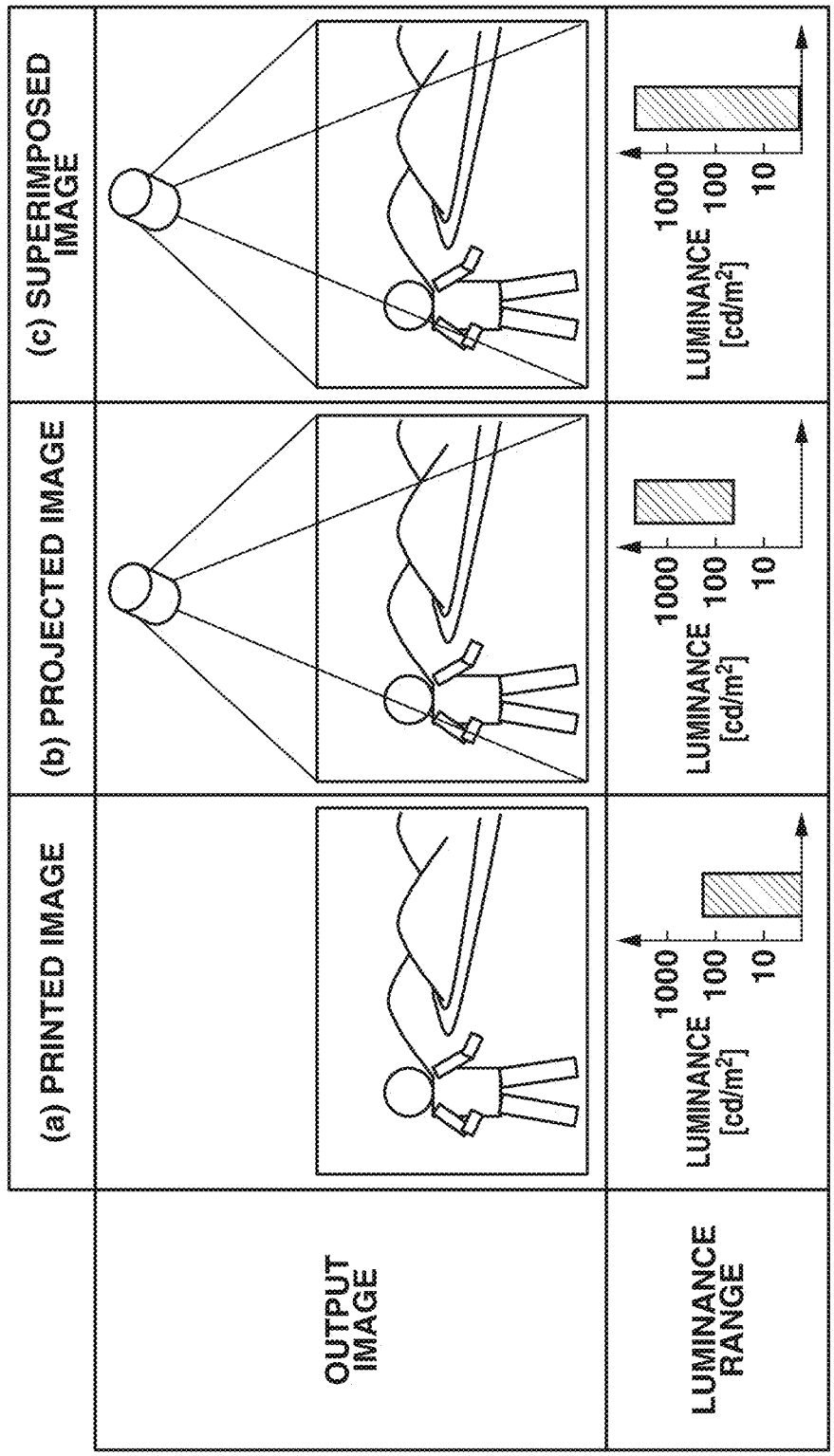

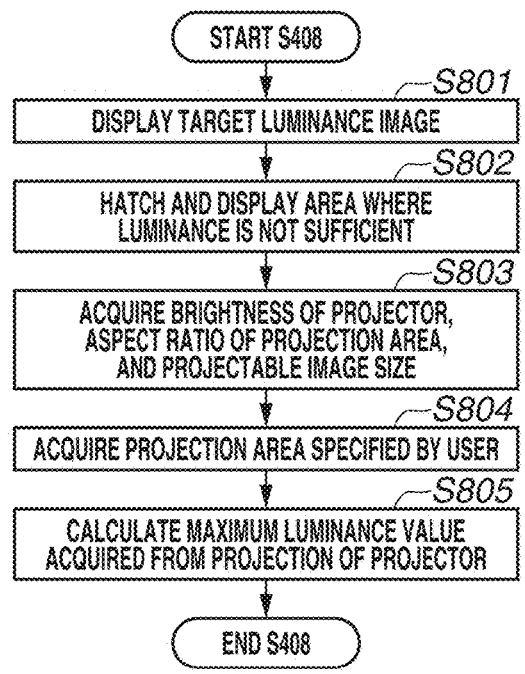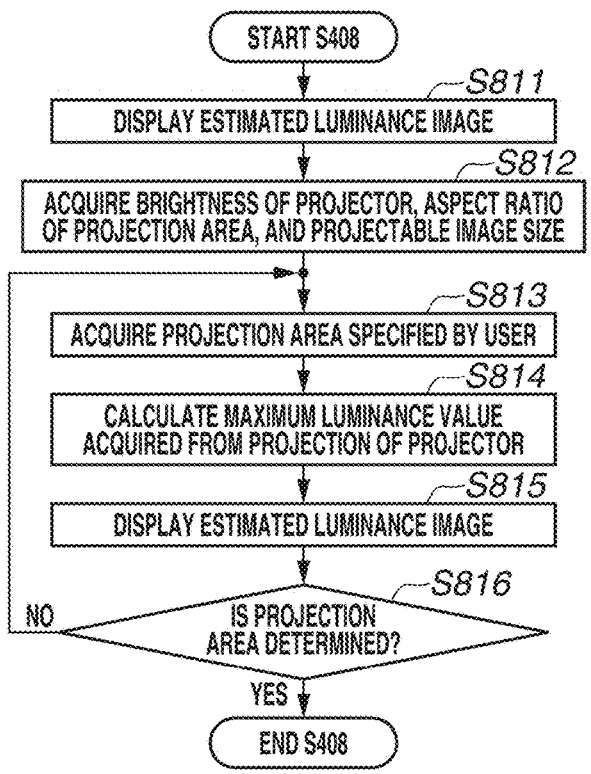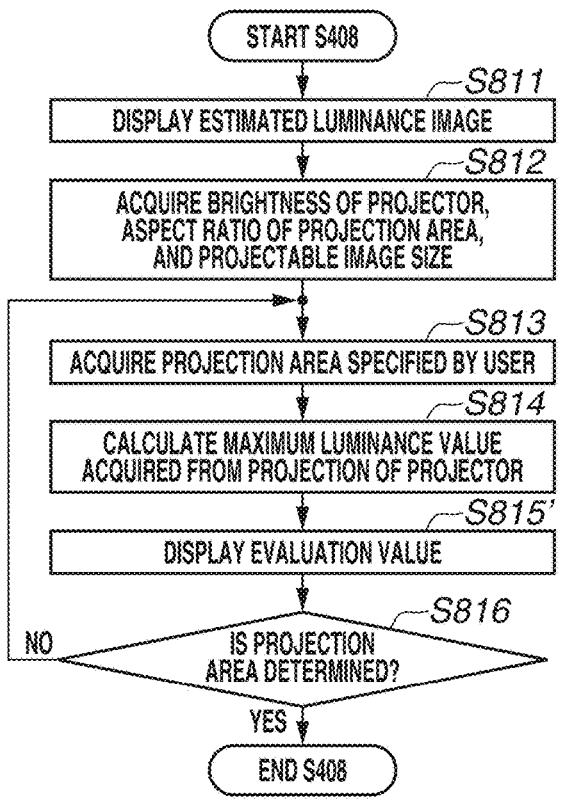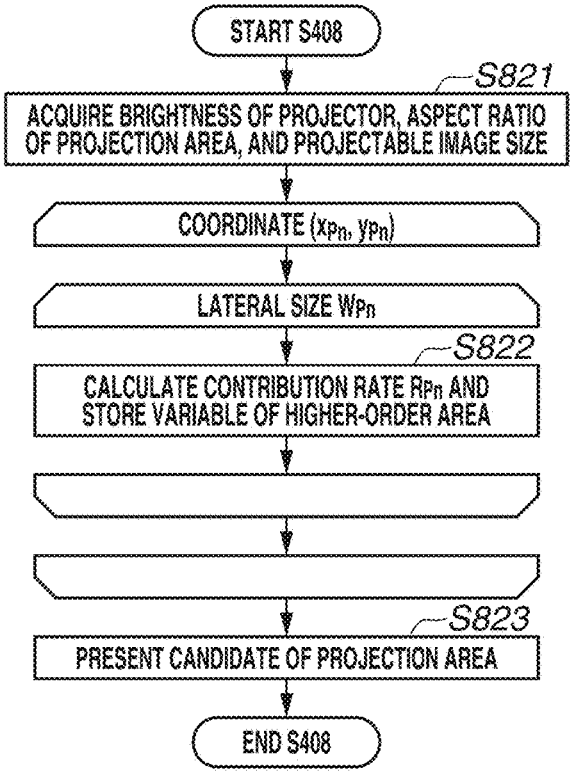

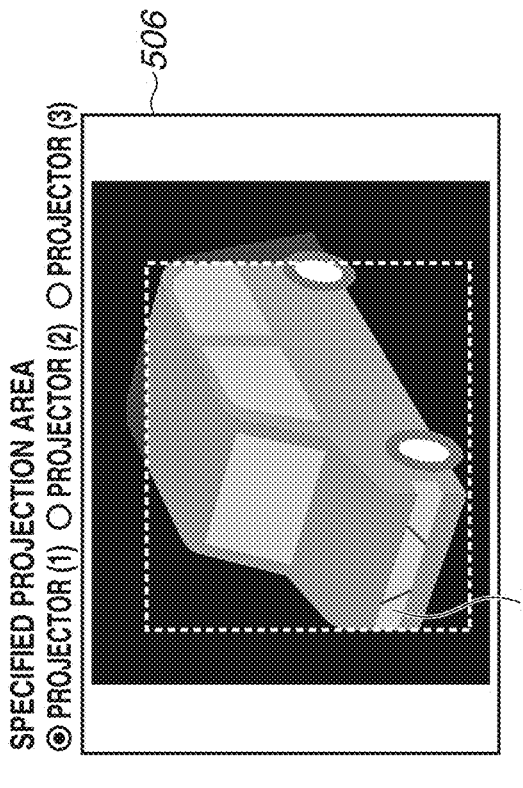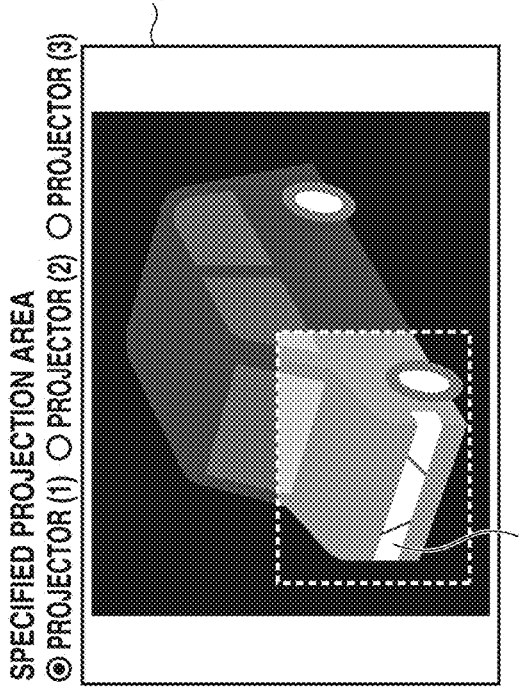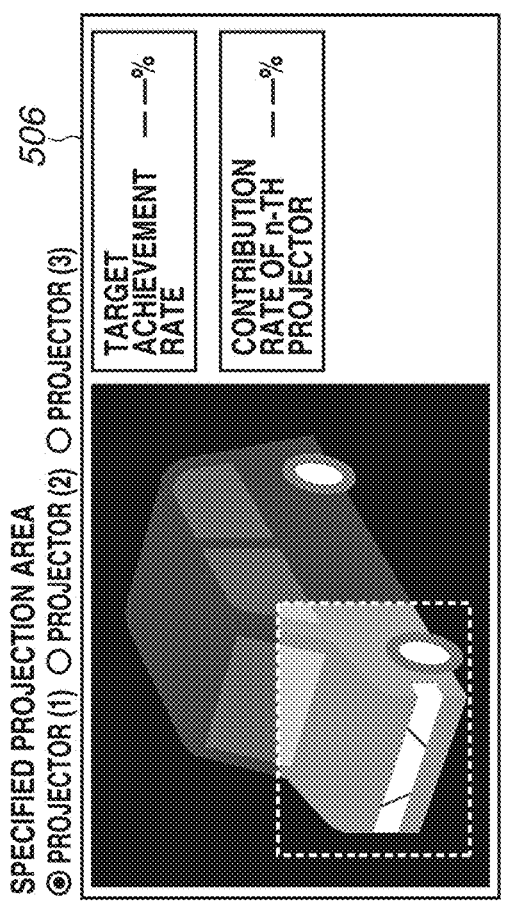

INFORMATION PROCESSING APPARATUS, METHOD, AND STORAGE MEDIUM

BACKGROUND

Field of the Disclosure

The present disclosure generally relates to information processing and, more particularly, to an information processing apparatus, an information processing method, a storage medium, and an information processing technique for generating a single image by combining images respectively output from a plurality of devices.

Description of the Related Art

In recent years, a resolution of an image has been improved, or a reproducible luminance range has been expanded by superimposing a plurality of images using a plurality of devices such as projectors. Japanese Patent Application Laid-Open No. 2004-070257 discusses a technique for projecting an image on an optional part of an image projected by one projector by using another projector.

However, with the conventional technique described in Japanese Patent Application Laid-Open No. 2004-070257, an area in a projection target image where a partial projection is to be executed, cannot be determined when a reproduction target image is to be reproduced by superimposing images.

SUMMARY

Therefore, the present disclosure is directed to a technique for executing processing for determining an area in a projection target image where partial projection is executed when an image is projected on a partial area in the projection target image.

According to an aspect of the present disclosure, an information processing apparatus includes an acquisition unit configured to acquire image data representing an image generated by projecting a first image on a part of a second image using at least one projection apparatus and a control unit configured to control a presentation unit to present, to a user, an area in the second image where the first image should be projected by the at least one projection apparatus based on the image data.

Further features of the present disclosure will become apparent from the following description of exemplary embodiments with reference to the attached drawings.

BRIEF DESCRIPTION OF THE DRAWINGS

FIGS. 1A and 1B are block diagrams illustrating a configuration of an information processing apparatus.

FIG. 2 is a schematic diagram illustrating luminance ranges of output images.

FIGS. 7A to 7D are flowcharts illustrating a flow of processing for acquiring projection information.

FIGS. 8A to 8C are schematic diagrams illustrating examples of an area specification window displayed on the GUI.

DESCRIPTION OF THE EMBODIMENTS

Figure 3A:
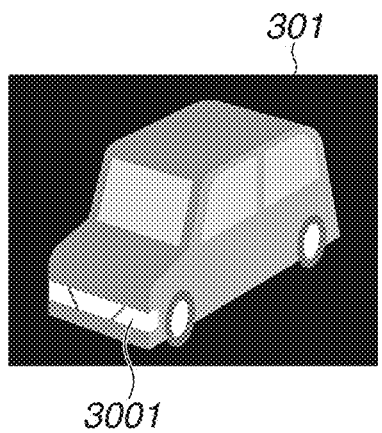
FIGS. 3A to 3E are schematic diagrams illustrating a method of generating a superimposed image using a plurality of projectors.

Hereinafter, various exemplary embodiments, features, and aspects of the present disclosure will be described with reference to the appended drawings. In addition, the below-described exemplary embodiments are not intended to limit the content of the present disclosure. Further, not all of the combinations of features described in the exemplary embodiments may be necessary as solutions of the present disclosure.

In the first exemplary embodiment, in order to reproduce an image having a wide luminance range, images output from a plurality of devices are superimposed to each other. Specifically, an image projected by a projector (hereinafter, called as "projected image") is superimposed on a printed matter output from a printer. In addition, an image printed as a printed matter serving as a projection target in the present exemplary embodiment will be referred to as a "printed image". Processing for expanding a luminance range reproducible by a single device by superimposing the above-described images output from a plurality of different devices will be described with reference to FIGS. 2A to 2C.

First, a luminance range of the printed image under general illumination is illustrated by (a) in FIG. 2. The printed image under general illumination has a luminance range having a maximum luminance of approximately 100 $cd/m^2$. A printer is a device preferable for reproducing the luminance of a dark area in the image. On the other hand, a luminance range of the projected image under the general illumination is illustrated by (b) in FIG. 2. The projected image illustrated by (b) in FIG. 2 is an image projected on a white screen on which an image is not printed. The projected image under general illumination has a luminance range of the maximum luminance of 1000 $cd/m^2$ or more and the minimum luminance of 100 $cd/m^2$. In other words, the projector is a device preferable for reproducing the luminance of a bright area in the image.

As described above, reproduction precision can be improved in both of the dark portion and the bright portion by superimposing an output image of the printer preferable for reproducing the luminance in a dark area and an output image of the projector preferable for reproducing the luminance in a bright area. A luminance range of an image acquired by superimposing the projected image on the printed image (hereinafter, referred to as "superimposed image") under general illumination is illustrated by (c) in FIG. 2. It is found that the superimposed image under general illumination has a luminance range wider than that of the output image independently acquired from the printed image or the projected image. However, in a case where the luminance range of the reproduction target image includes an area having high luminance that is not included in the luminance range illustrated by (c) in FIG. 2, the reproduction target image cannot be reproduced merely by projecting the projected image of a single projector having the luminance range illustrated by (b) in FIG. 2 on the printed image. Accordingly, in the present exemplary embodiment, a reproduction target image is reproduced by projecting the projected images of a plurality of projectors on the printed image.

Figure 3B:
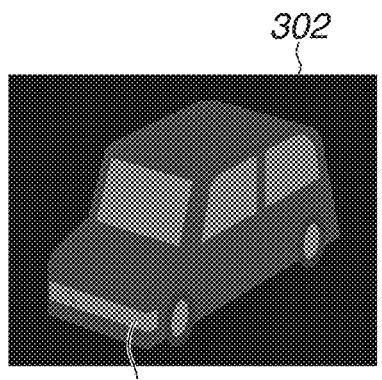
Figure 3C:
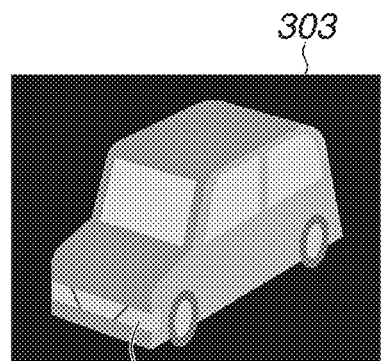
Figure 3D:
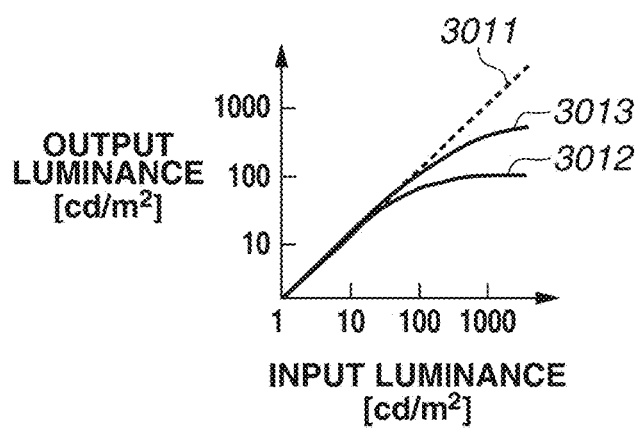

FIGS. 3A to 3E are diagrams illustrating a method of generating a superimposed image through a plurality of projectors. FIG. 3A illustrates a luminance distribution of a reproduction target image 301, and a straight line 3011 in FIG. 3D illustrates a relationship between the input luminance and the output luminance at a maximum luminance portion 3001. The output luminance with respect to the maximum input luminance in the reproduction target image 301 is approximately 3000 cd/m². FIG. 3B illustrates a luminance distribution of a printed image 302 under general illumination, and a curved line 3012 in FIG. 3D illustrates a relationship between the input luminance and the output luminance at a maximum luminance portion 3002. The output luminance with respect to the maximum input luminance in the printed image 302 is approximately 100 cd/m². FIG. 3C illustrates a luminance distribution of a superimposed image 303, and a curved line 3013 in FIG. 3D illustrates a relationship between the input luminance and the output luminance at a maximum luminance portion 3003. The output luminance with respect to the maximum input luminance in the superimposed image 303 is approximately 800 cd/m². In the above example, a target luminance is not achieved at the maximum luminance portion 3003 merely by superimposing the projected image by a single projector on the printed image.

Figure 3E:
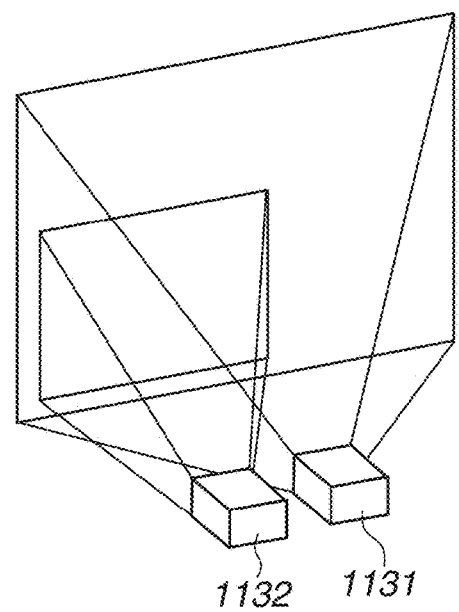

Therefore, in the present exemplary embodiment, as illustrated in FIG. 3E, in addition to a first projector 1131 for projecting an image on the entire portion of the printed image, a second projector 1132 for projecting an image on a part of the area of the printed image is used. Both of the first projector 1131 and the second projector 1132 are projectors having the luminance distribution illustrated in FIG. 3C and the curved line 3012 as output characteristics thereof. Generally, when a projection area is reduced by adjusting the arrangement of the projector or by using a zoom lens, brightness per unit area, i.e., illuminance, of the projector can be increased. Accordingly, the second projector 1132 projects an image on a partial area having a size smaller than a size of the entire printed image. With this configuration, the second projector 1132 can project an image with higher luminance at the maximum luminance portion 3003, so that the target luminance of the maximum luminance portion 3001 can be realized. In the present exemplary embodiment, as illustrated in FIG. 3E, a projected image having a size the same as the size of the printed image is projected by the first projector 1131. Further, with respect to the area where the target luminance is not achieved, a projected image is partially projected by the second projector 1132. In the present exemplary embodiment, for simplification, just one projector has been described as the second projector 1132 that executes partial projection. However, partial projection may be executed by a plurality of projectors.

<Hardware Configuration of Information Processing Apparatus 1>

FIG. 1A is a block diagram illustrating a hardware configuration of the information processing apparatus 1. The information processing apparatus 1 includes a central processing unit (CPU) 101, a read only memory (ROM) 102, and a random access memory (RAM) 103. The information processing apparatus 1 further includes a video card (VC) 104, a universal interface (I/F) 105, a serial advanced technology attachment (SATA) I/F 106, and a network interface card (NIC) 107. The CPU 101, which may include one or more processors, one or more memories, circuitry, or a combination thereof, may use the RAM 103 as a work memory to execute an operating system (OS) or various programs stored in the ROM 102 or a hard disk drive (HDD) 114. Further, the CPU 101 may control various constituent elements via a system bus 108. In addition, the CPU 101 loads a program code stored in the ROM 102 or the HDD 114 on the RAM 103 and executes the processing illustrated in the below-described flowchart. A display 116 is connected to the VC 104. An input device 110 such as a mouse or a keyboard, a printer 111, and a projector group 112 are connected to the universal I/F 105 via a serial bus 109. A universal drive 115 which reads and writes the HDD 114 or various storage media is connected to the SATA I/F 106 via a serial bus 113. The NIC 107 exchanges information with an external apparatus. The CPU 101 uses the HDD 114 or various storage media mounted on the universal drive 115 as storage areas of various data. The CPU 101 displays a graphical user interface (GUI) provided by a program on the display 116, and receives an input such as a user instruction accepted via the input device 110. The printer 111 according to the present exemplary embodiment is an ink-jet printer which forms a printed image on a recording medium by using ink.

<Logical Configuration of Information Processing Apparatus 1>

FIG. 1B is a block diagram illustrating a logical configuration of the information processing apparatus 1 according to the present exemplary embodiment. The CPU 101 reads and executes a program stored in the ROM 102 or the HDD 114 by using the RAM 103 as a work area to function as a logical configuration illustrated in FIG. 1B. In addition, not all of the processing described below has to be executed by the CPU 101, and the information processing apparatus 1 may be configured to execute all or a part of the processing through one or a plurality of processing circuits other than the CPU 101.

Figure 5:
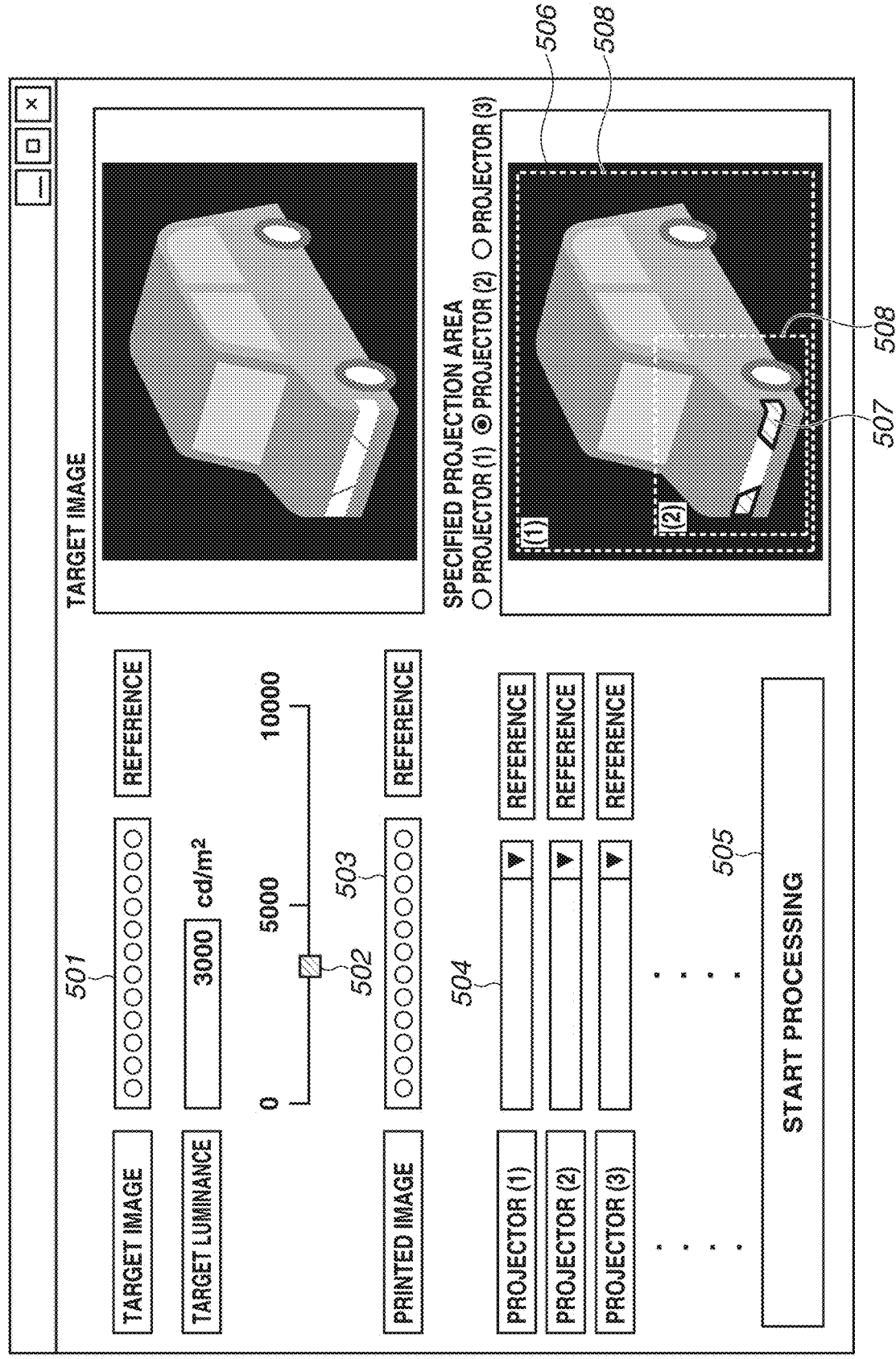
FIG. 5 is a schematic diagram illustrating an example of a graphical user interface (GUI).

The information processing apparatus 1 includes a first acquisition unit 201, a first conversion unit 202, a second acquisition unit 203, a second conversion unit 204, a calculation unit 205, a specification unit 206, a third acquisition unit 207, and a generation unit 208. According to an instruction input by a user, the first acquisition unit 201 acquires target image data representing an image (hereinafter, referred to as a "target image") as a reproduction target reproduced by superimposing a printed image and a projected image and a maximum luminance value (target luminance value) of the target image. Specifically, according to user instructions input to an area 501 and a slide box 502 in a GUI in FIG. 5 displayed on the display 116, target image data and a maximum luminance value are read from the HDD 114 to a storage device such as the RAM 103. The first conversion unit 202 converts pixel values of the target image into values defined in a linear color space. The pixel values of the target image are RGB values defined in the sRGB space, whereas the values defined in the linear color space are tristimulus values (XYZ values) defined in the CIE-1913 XYZ color space. In other words, the first conversion unit 202 converts the RGB values into the XYZ values. According to the instruction input by the user, the second acquisition unit 203 acquires printed image data used for forming a printed image using the printer 111. Specifically, according to the user instruction input to the area 503 in the GUI in FIG. 5 displayed on the display 116, the printed image data is read from the HDD 114 to the storage device such as the RAM 103. The second conversion unit 204 converts the pixel values of the printed image to values defined in the linear color space. Through the above conversion, the RGB values are converted into the XYZ values.

Based on the target image data converted by the first conversion unit 202 and printed image data converted by the second conversion unit 204, the calculation unit 205 generates target projected image data representing an image (target projected image) to be output as a projected image. The printed image according to the present exemplary embodiment is a piece of printed matter. Further, a constant luminance range can be reproduced in the printed image when reflectance is constant in every area and an observation environment is fixed. The calculation unit 205 divides the luminance of the target image by the luminance reproduced by the printed image to calculate a target projected image that should be reproduced by only the projected images projected by a combination of one or more projectors. The specification unit 206 specifies the XYZ values that are not sufficient for reproducing the target projected image. The third acquisition unit 207 acquires projection information indicating brightness capable of being output from a projector included in the projector group 112, a projection area, a projection position in the printed image, and a conversion matrix representing a relationship between the input RGB values and the output XYZ values of the projector. Based on the XYZ values specified by the specification unit 206 and the projection information acquired by the third acquisition unit, the generation unit 208 generates projected image data representing projected images projected by respective projectors of the projector group 112.

<Processing Executed by Information Processing Apparatus 1>

Figure 4:
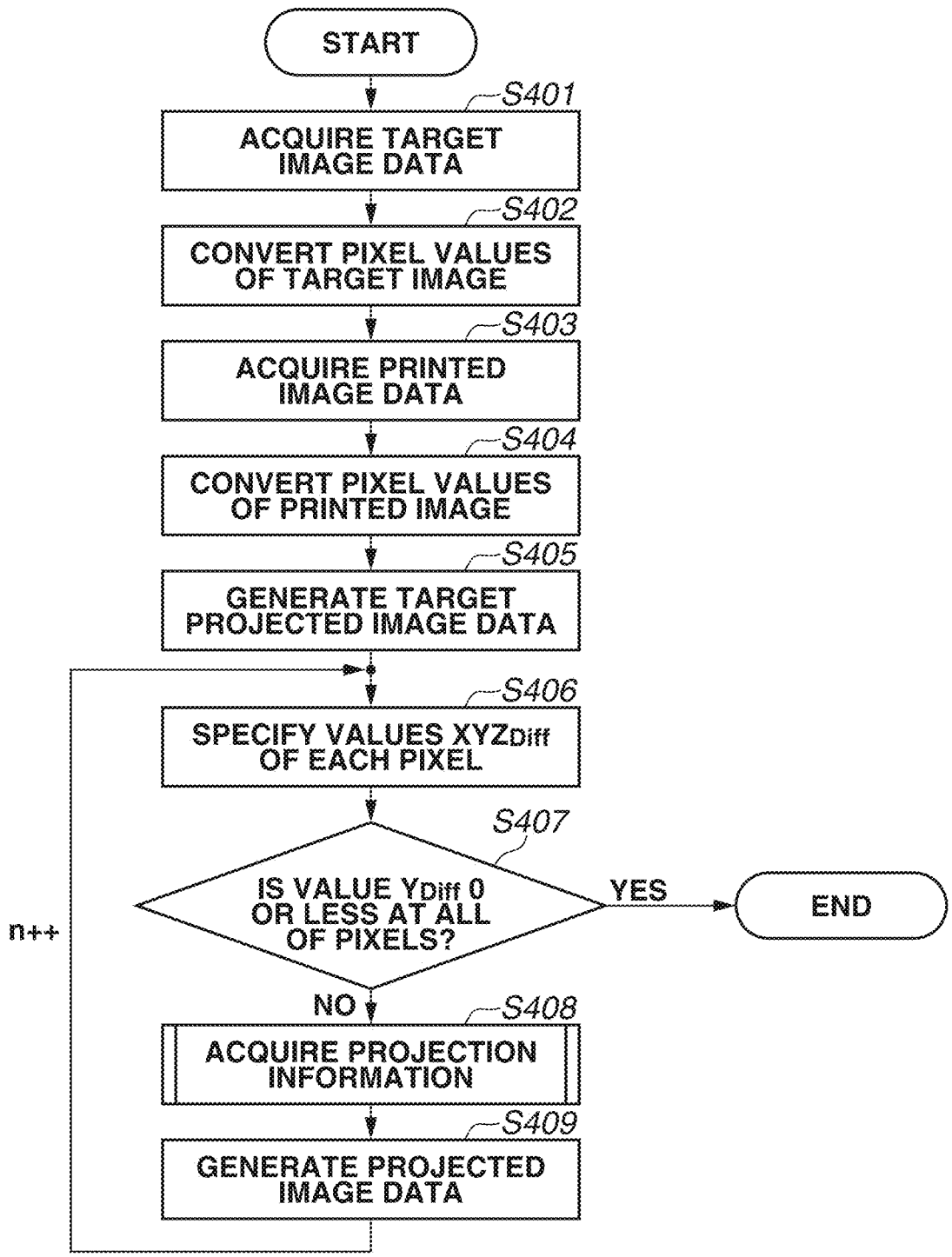
FIG. 4 is a flowchart illustrating a flow of processing executed by the information processing apparatus.

FIG. 4 is a flowchart illustrating a flow of processing executed by the information processing apparatus 1. Hereinafter, each step (of processing) is expressed by a reference numeral prefixed with a letter "S". The processing in step S401 is started when a processing start button 505 is pressed after information is input to the area 501, the slide box 502, and the area 503 in the GUI in FIG. 5.

First, in step S401, the first acquisition unit 201 acquires target image data representing the target image and the maximum luminance value of the target image from the HDD 114. Hereinafter, pixel values of a pixel position (x, y) in the target image are expressed as "$RGB_T(x, y)$", and the maximum luminance value is expressed as "$Cd_T$". The target image is an image consisting of pixels each of which includes color information of a total of 48-bit, i.e., 16-bit each of the colors red (R), green (G), and blue (B). The pixel values of the target image in the present exemplary embodiment are RGB values defined in the sRGB space. A pixel position (x, y) represents a pixel position in the image when coordinates in a lateral direction and a longitudinal direction of the pixel are respectively expressed as "x" and "y".

Next, in step S402, the first conversion unit 202 converts the pixel values $RGB_T(x, y)$ as RGB values into tristimulus values (XYZ values) defined in the CIE-1913 XYZ color space. Specifically, the converted pixel values $XYZ_T(x, y)$ are calculated based on formula 1.

$$\begin{pmatrix} X \\ Y \\ Z \end{pmatrix} = M \begin{pmatrix} R \\ G \\ B \end{pmatrix} \quad \text{Formula 1}$$

Herein, the symbols "R", "G", and "B" respectively represent a value R, a value G, and a value B which constitute the pixel values $RGB_T(x, y)$. The symbols "X", "Y", and "Z" respectively represent a value X, a value Y, and a value Z which constitute the pixel values $XYZ_T(x, y)$. The symbol "M" represents a conversion matrix for converting the RGB values defined in the sRGB space into the XYZ values defined in the CIE-1913 XYZ color space.

Through the conversion of the RGB values into the XYZ values executed in step S402, calculation for determining the pixel values in the projected image projected by the projector group 112 can be executed easily. Specifically, an effect of converting the RGB values into the XYZ values will be described. For example, when a superimposed image is to be generated by superimposing the projected images projected by two projectors, reproduced color will be different depending on the ratio of the pixel values of the pixels to be superimposed even when the same value is acquired as the sum of the pixel values of the two projected images in the non-linear sRGB space. The RGB values are expressed as (R, G, B). For example, it is assumed that the pixel values of a pixel $I_1$ in the first projected image are (0, 0, 0), and the pixel values of a pixel $I_2$ in the second projected image are (128, 128, 128). Further, it is assumed that the pixel values of a pixel $J_1$ in the first projected image are (64, 64, 64), and the pixel values of a pixel $J_2$ in the second projected image are (64, 64, 64).

When the first projected image and the second projected image are superimposed, the color expressed by the superimposed pixels $I_1$ and $I_2$ is different from the color expressed by the superimposed pixels $J_1$ and $J_2$. On the other hand, in the linear XYZ space, regardless of the combination of the XYZ values of the pixels in the two superimposed projected images, color expressed in the superimposed projected image can be treated as the same color if the same value is acquired as a sum of the pixel values. Therefore, by calculating a difference between the XYZ values of the target image and the XYZ values of one of the projected images, the XYZ values that should be reproduced by another projected image can be acquired easily.

Next, in step S403, the second acquisition unit 203 acquires the printed image data, a longitudinal size and a lateral size of the printed image, and a conversion matrix that expresses the color reproduction characteristics of the printer 111. Units of both of the longitudinal and the lateral sizes are "meter (m)". Hereinafter, the pixel values of the pixel position (x, y) in the printed image are expressed as "$RGB_{Print}(x, y)$", a longitudinal size of the printed image is expressed as "$H_{Print}$", a lateral size of the printed image is expressed as "$W_{Print}$", and a conversion matrix that expresses the color reproduction characteristics of the printer 111 is expressed as "$M_P$". The printed image is an image consisting of pixels, each of which includes color information of a total of 48-bit, i.e., 16-bit each of the colors red (R), green (G), and blue (B). The pixel values of the printed image in the present exemplary embodiment are RGB values defined in the sRGB space.

Generally, because a color gamut that can be expressed in the sRGB space is different from a color gamut reproducible by the printer, the values acquired by converting the RGB values using the above-described formula 1 do not match the values acquired by executing colorimetry of the printed image. For this reason, in the present exemplary embodiment, a conversion matrix $M_P$, which describes a relationship between the RGB values input to the printer 111 and the XYZ values acquired by performing colorimetry of the printed image formed based on the input RGB values, is previously created and stored in a storage device such as the HDD 114. In step S403, the second acquisition unit 203 acquires the previously created conversion matrix $M_P$ from the HDD 114. In addition, the printed image illustrated by the printed image data acquired in step S403 of the present exemplary embodiment is the same as the target image represented by the target image data acquired in step S401.

Next, in step S404, based on formula 2, the second conversion unit 204 converts the pixel values $RGB_{Print}(x, y)$ as the RGB values into the tristimulus values (XYZ values)

defined in the CIE-1913 XYZ color space. Specifically, the converted pixel values $XYZ_{Print}(x, y)$ are calculated based on formula 2.

$$\begin{pmatrix} X \\ Y \\ Z \end{pmatrix} = M_{print} \begin{pmatrix} R \\ G \\ B \end{pmatrix} \quad \text{Formula 2}$$

Herein, the symbols "R", "G", and "B" respectively represent a value R, a value G, and a value B which constitute the pixel values $RGB_{Print}(x, y)$. The symbols "X", "Y", and "Z" respectively represent a value X, a value Y, and a value Z which constitute the pixel values $XYZ_{Print}(x, y)$.

In step S405, based on the target image data converted in step S402 and the printed image data converted in step S404, the calculation unit 205 generates target projected image data. Specifically, by using the pixel values $XYZ_T(x, y)$ of the target image and the pixel values $XYZ_{Print}(x, y)$ of the printed image, pixel values $XYZ_{TProject}(x, y)$ are calculated using formula 3.

$$X_{TProject} = X_T / X_{Print}$$

$$Y_{TProject} = Y_T / Y_{Print}$$

$$Z_{TProject} = Z_T / Z_{Print} \quad \text{Formula 3}$$

Herein, the symbols "$X_T$", "$Y_T$", and "$Z_T$" respectively represent a value X, a value Y, and a value Z which constitute the pixel values $XYZ_T(x, y)$. The symbols "$X_{Print}$", "$Y_{Print}$", and "$Z_{Print}$" respectively represent a value X, a value Y, and a value Z which constitute the pixel values $XYZ_{Print}(x, y)$. For example, in a case where a pixel A in the printed image and a pixel B in the projected image are superimposed, a product of the XYZ values of the pixel A and the XYZ values of the pixel B is the XYZ values of a corresponding position in the superimposed image. Therefore, the XYZ values of the pixel B are calculated so that a product of the XYZ values of the pixel A and the XYZ values of the pixel B becomes the pixel values of a corresponding pixel in the target image. In step S405, with respect to each of the pixels, the calculation unit 205 divides the pixel values of the target image by the pixel values of the corresponding printed image to calculate pixel values of the target projected image.

The following processing in steps S406 to S409 is executed repeatedly until the below-described condition in step S407 is satisfied. By repeatedly executing the processing in steps S406 to S409, it is possible to generate projected image data corresponding to respective projectors of the number used for reproducing the target projected image.

In step S406, the specification unit 206 specifies the XYZ values lacking for reproducing the target projected image (insufficient XYZ values). Specifically, the insufficient pixel values $XYZ_{Diff}$ are calculated using formula 4.

$$X_{Diff} = X_{TProject} - \sum_{k=0}^{n-1} (X_{Pk} \cdot Cd_{Pk} / Cd_T)$$

$$Y_{Diff} = Y_{TProject} - \sum_{k=0}^{n-1} (Y_{Pk} \cdot Cd_{Pk} / Cd_T)$$

$$Z_{Diff} = Z_{TProject} - \sum_{k=0}^{n-1} (Z_{Pk} \cdot Cd_{Pk} / Cd_T) \quad \text{Formula 4}$$

Herein, the symbols "$X_{Diff}$", "$Y_{Diff}$", and "$Z_{Diff}$" respectively represent a value X, a value Y, and a value Z which constitute the pixel values $XYZ_{Diff}(x, y)$. The symbol "n" represents a value of the n-th projector from among the projector group 112. An initial value of "n" is "1". The symbol "$\Sigma X_{Pk}$" represents an integrated value X of the projected images respectively corresponding to the projectors up to the n−1th projector which project images for generating the superimposed image. Similarly, the symbols "$\Sigma Y_{Pk}$" and "$\Sigma Z_{Pk}$" respectively represent an integrated value Y and an integrated value Z. Further, each of the values $X_P$, $Y_P$, and $Z_P$ is normalized by a ratio $Cd_P/Cd_T$ between the maximum luminance value $Cd_P$ of the projector to be used and the maximum luminance value $Cd_T$ of the target image acquired in step S401. For example, in a case where the XYZ values (1, 1, 1) of the projector having the maximum luminance value $Cd_P$ of 100 cd/m² are to be normalized by the maximum luminance value $Cd_T$ of 200 cd/m² of the target image, as a result of normalization, (0.5, 0.5, 0.5) are acquired as the XYZ values (i.e., (1, 1, 1)×100/200=(0.5, 0.5, 0.5)). In step S408, the maximum luminance value $Cd_P$ is calculated using formula 5.

In a case where the value n is 1 (n=1), the pixel values $XYZ_{Diff}(x, y)$ represent pixel values lacking for achieving the target image only with the printed image, so that the values are the same as the pixel values $XYZ_{TProject}(x, y)$ if ambient light is not taken into consideration. Therefore, each of the values $X_{P0}$, $Y_{P0}$, and $Z_{P0}$ is 0. In the present exemplary embodiment, for the sake of simplicity, the ambient light can be ignored. Therefore, when the value n is 1 (n=1), normalization of the XYZ values with the ratio $Cd_P/Cd_T$ is not executed.

In step S407, the specification unit 206 determines whether a condition for ending the processing is satisfied. If the condition is not satisfied (NO in step S407), the processing proceeds to step S408. If the condition is satisfied (YES in step S407), the processing is ended. Herein, the condition for ending the processing is that the value $Y_{Diff}$ from among the values $XYZ_{Diff}$ calculated in step S406, which represents an amount of insufficient luminance, becomes 0 or less at all of the pixels.

In step S408, the third acquisition unit 207 acquires the above-described projection information. Specifically, the projection information indicates brightness $Lm_{Pn}$ (in a unit of "lm") of the n-th projector regarded as a target from among the projector group 112. The projection information further indicates a coordinate ($x_{Pn}$, $y_{Pn}$) representing a projection position in the printed image, the longitudinal size Hp. and the lateral size $W_{Pn}$ of the projection area, and a conversion matrix $M_{PJn}$ representing a relationship between the input RGB values and the output XYZ values of the n-th projector. Both of the longitudinal size Hp. and the lateral size $W_{Pn}$ of the projection area are in a unit of meter (m). Herein, the coordinate ($x_{Pn}$, $y_{Pn}$) is a coordinate at the upper left end of the projection area in the coordinate system of the printed image. In addition, for the sake of simplicity, it is assumed that the projection area is not rotated or distorted with respect to the printed image.

Further, in step S408, the third acquisition unit 207 calculates the maximum luminance value $Cd_{Pn}$ (in a unit of "cd/m²") acquired from the projection executed by the n-th projector using the following formula 5.

$$Cd_{Pn} = (Lm_{Pn}/(H_{Pn} \cdot W_{Pn})) \cdot k \quad \text{Formula 5}$$

Herein, "k" is a coefficient representing a ratio between the illuminance on a surface of the printed image and the observed luminance, and the coefficient k depends on the reflectance or the variation angle reflection characteristics of the recording medium used for forming a printed image. The coefficient k is calculated by previously measuring the printed image, and stored in a storage device such as the HDD 114 at each type of recording medium. In addition, the coefficient k may be defined as k=(reflectance R of recording medium/circumference ratio π) based on the assumption that incident light isotropically diffuses on the surface of the printed image.

Hereinafter, the processing in step S408 will be described in detail. FIG. 7A is a flowchart illustrating a flow of processing in step S408. In step S801, the third acquisition unit 207 displays a target luminance image consisting of pixels each of which has the value Y representing the luminance from among the pixel values of the target image on the window 506 displayed on the GUI in FIG. 5. An area where luminance is not sufficient for reproducing the target image is illustrated in the window 506, and a range where projection is executed on the printed image by a projector of a type specified in the projector specification box 504 is also specified in the window 506. The projector specification box 504 is an object serving as a pull-down menu and a text input column, which allows a user to specify a type of the projector. A projector type is stored in a storage device such as the HDD 114 in association with brightness of the projector, an aspect ratio of the projection area, a projectable minimum image size, a projectable maximum image size, and a conversion matrix.

In step S802, with respect to the target luminance image displayed on the window 506, the third acquisition unit 207 hatches and displays an area where luminance is not sufficient, which is specified in step S406. An area where the value $Y_{Diff}$ is greater than 0 corresponds to the area where luminance is not sufficient. An area 507 illustrates an example of display executed on the area where luminance is not sufficient. By executing display control of hatching or blinking the area where luminance is not sufficient, the area where the image should be projected by the projector of the specified type can be presented to the user.

In step S803, the third acquisition unit 207 acquires brightness of the projector of a type specified in the n-th projector specification box 504, an aspect ratio of the projection area, a projectable minimum image size, and a projectable maximum image size from the HDD 114. A frame 508 represents a projection area of the projector of the type specified in the projector specification box 504. Within a range of the projectable image size, a size or a position of the frame 508 can be changed or specified by the user via the input device 110. For the sake of simplicity, in the present exemplary embodiment, it is assumed that a projected image of the first projector has an aspect ratio and an area the same as those of the printed image. In other words, the first projector projects the image having a size the same as the size of the printed image on the entire area of the printed image.

In step S804, the third acquisition unit 207 acquires, for the n-th projector, a longitudinal size $H_{Pn}$ in a unit of meter (m), a lateral size $W_{Pn}$ in a unit of meter (m), and a projection position $(x_{Pn}, y_{Pn})$ of the projection area specified by the user in the window 506.

In step S805, the third acquisition unit 207 calculates the maximum luminance value $Cd_{Pn}$ in a unit of $cd/m^2$ acquired from projection executed by the n-th projector using formula 5. After the processing in step S805 ends, the processing proceeds to step S409.

Next, in step S409, the generation unit 208 generates projected image data representing a projected image projected by the n-th projector. Specifically, the pixel values $X_{Pn}$, $Y_{Pn}$, and $Z_{Pn}$ of each of the pixels in the projected image are calculated based on formula 6.

$$X_{Pn} = \text{clip}(X_{Diff} Cd_{Pn}/Cd_T)$$

$$Y_{Pn} = \text{clip}(Y_{Diff} Cd_{Pn}/Cd_T)$$

$$Z_{Pn} = \text{clip}(Z_{Diff} Cd_{Pn}/Cd_T) \qquad \text{Formula 6}$$

Herein, "clip (P, Q)" represents a function for replacing an argument P having a value greater than an argument Q with the argument Q. In other words, the maximum XYZ values for the insufficient XYZ values that can be supplemented by the n-th projector are calculated using formula 6. The projected image projected by the n-th projector includes pixels of the number the same as the number of pixels included in the target image. Further, the projected image projected by the n-th projector has pixel values only within a range of the projection area determined by the projection position $(x_{Pn}, y_{Pn})$, the longitudinal size $H_{Pn}$, and the lateral size $W_{Pn}$ of the projection area acquired in step S408. The projected image retains 0 as the pixel values outside that range.

Further, in step S409, the generation unit 208 multiplies the calculated pixel values $X_{Pn}$, $Y_{Pn}$, and $Z_{Pn}$ by the ratio $Cd_T/Cd_P$ to return the pixel values $X_{Pn}$, $Y_{Pn}$, and $Z_{Pn}$ to the luminance range before normalization processing executed in step S406.

Further, in step S409, the generation unit 208 cuts out a range of the projection area projected by the n-th projector from the projected image and converts the pixel values (XYZ values) of the cutout projected image into RGB values based on formula 7. The projected image cut out from the projected image, pixel values of which are converted into the RGB values, is specified as an output projected image that is to be output to the n-th projector, and data representing the output projected image is specified as output projected image data.

$$\begin{pmatrix} R \\ G \\ B \end{pmatrix} = M_{(Project)n}^{-1} \begin{pmatrix} X \\ Y \\ Z \end{pmatrix} \qquad \text{Formula 7}$$

Herein, the values "X", "Y", and "Z" respectively correspond to the values "$X_{Pn}$", "$Y_{Pn}$", and "$Z_{Pn}$". A conversion matrix $M_{(Project)n}$ is a conversion matrix retained in the HDD 114 in association with the projector type, and the input RGB values of the n-th projector are converted into the output XYZ values by the conversion matrix $M_{(Project)n}$. Herein, an inverse matrix of the conversion matrix $M_{(Project)n}$ is used for converting the XYZ values into the RGB values. The generated output projected image data is output to the n-th projector. After outputting the output projected image data, "1" is added to the value "n", and the processing returns to step S406.

<Effect of First Exemplary Embodiment>

Figure 6A:
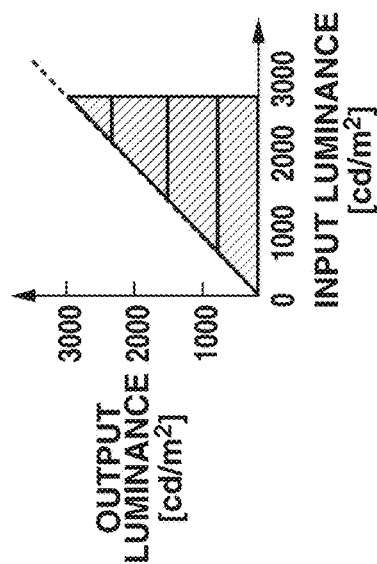
FIGS. 6A to 6E are schematic diagrams illustrating a relationship between a projection area and a luminance range.
Figure 6B:
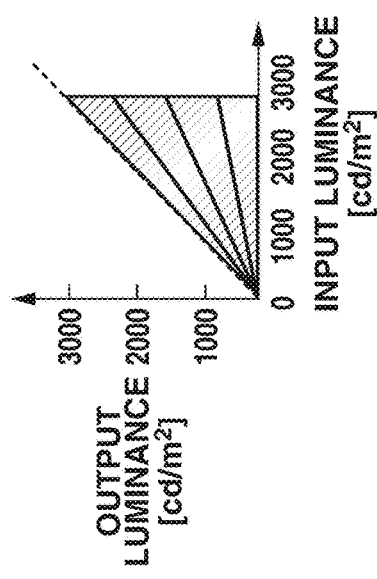
Figure 6C:
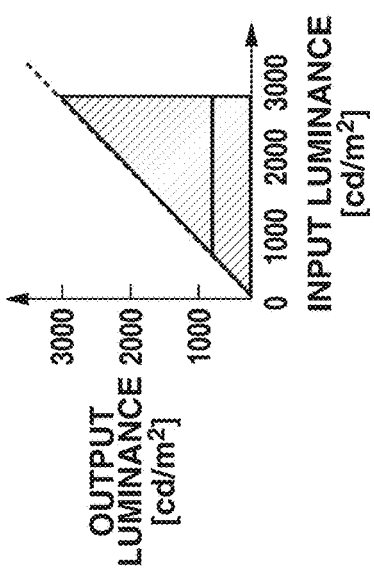
Figure 6D:
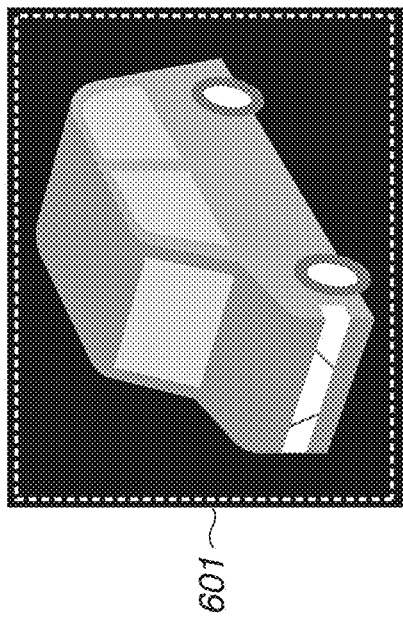
Figure 6E:
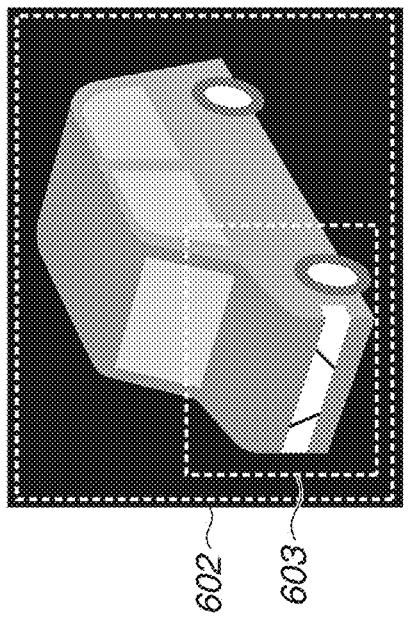

As described above, the information processing apparatus according to the present exemplary embodiment acquires image data representing an image to be generated by projecting a projected image on a part of a projection target image through at least one projection apparatus. Based on the image data, the information processing apparatus controls the presentation unit to present, to the user, an area in the projection target image where the projected image should be projected by at least one projection apparatus. With this processing, when an image is to be projected on a partial area in the projection target image, an area in the projection target image where partial projection is executed can be determined. Further, in the present exemplary embodiment, because an image can be projected on a partial area in the projection target image where the luminance is not sufficient, a high luminance area can be realized with a small number of projectors compared to the case where projection is executed on the entire area. A method of realizing a high luminance area using the projectors of the number less than the number of projectors for executing projection on the entire area will be described with reference to FIGS. 6A to 6E that are schematic diagrams illustrating a relationship between the projection area and the luminance range of the projector. FIG. 6A is a diagram illustrating an example of the projection area when partial projection is not executed, and a frame 601 represents projection areas of four projectors. FIG. 6D is a diagram illustrating an example of the projection area when partial projection is executed, and a frame 602 represents a projection area of the projector 1131 for executing overall projection, whereas a frame 603 represents a projection area of the projector 1132 for executing partial projection. FIGS. 6B and 6C are graphs schematically illustrating luminance ranges to be supplemented by respective projectors in order to achieve the target luminance when partial projection is not executed. FIG. 6E is a graph schematically illustrating luminance ranges to be supplemented by respective projectors in order to achieve the target luminance when partial projection is executed. For simplification, the luminance ranges to be supplemented by the projectors, as shown by graphs in FIGS. 6B, 6C, and 6E, are illustrated in a linear scale instead of a logarithmic scale.

As illustrated in FIGS. 3A to 3E, it is assumed that the maximum luminance is 800 cd/m² when overall projection is executed by using a single projector. In order to acquire the target luminance of 3000 cd/m² without executing partial projection, as illustrated in the luminance range of FIG. 6B, a method of superimposing the same overall projected images using four projectors can be employed. Alternatively, as illustrated in the luminance range of FIG. 6C, a method in which respective projectors project and superimpose images to maximally supplement the insufficient luminance as much as possible can also be employed. The above-described methods in FIGS. 6B and 6C may be combined with each other. However, in all of the above cases, four projectors are used for realizing the target luminance if overall projection is executed. On the other hand, as illustrated in the luminance range in FIG. 6D, partial projection can be executed by using the projected image generated through the processing according to the present exemplary embodiment. In this case, for example, when the frame 603 is one-fourth the size of the frame 602, luminance four times that realized by overall projection on the frame 602 can be realized if partial projection is executed on the frame 603. Therefore, as illustrated in the luminance range of FIG. 6E, luminance that cannot be sufficiently supplemented by the projector for executing overall projection can be supplemented by a single projector for executing partial projection. In other words, by employing the partial projection, desired luminance can be realized with the projectors of the number less than the number of projectors employed for the overall projection. With this configuration, even in a case where a large number of projectors or a projector capable of emitting a large amount of light cannot be prepared, an image having a desired luminance range can be generated by superimposing the images.

In the above-described exemplary embodiment, by displaying an area where luminance is not sufficient on the GUI, a position where partial projection should be executed is presented to the user. In the second exemplary embodiment, based on the projection area specified by the user, a luminance distribution of a superimposed image generated by superimposing images is estimated and displayed. A configuration of the information processing apparatus in the present exemplary embodiment is similar to that of the first exemplary embodiment, so that description thereof will be omitted. Hereinafter, a configuration of the present exemplary embodiment different from that of the first exemplary embodiment will be mainly described. In addition, the same reference numeral is assigned to the configuration similar to that of the first exemplary embodiment.

<Processing Executed by Information Processing Apparatus 1>

Hereinafter, a flow of processing executed by the information processing apparatus 1 according to the present exemplary embodiment will be described with reference to the flowchart in FIG. 7B. The processing in steps S401 to S407 and S409 is similar to the processing in steps S401 to S407 and S409 in the first exemplary embodiment, so that description thereof will be omitted. FIG. 7B is a flowchart illustrating a flow of processing in step S408.

In step S811, the third acquisition unit 207 estimates a luminance distribution of the superimposed image based on the value Y ($Y_{Print}$) of each pixel in the printed image and an integrated value of the value Y ($\Sigma Y_P$) of each pixel in the projected images corresponding the projectors up to the n−1th projector. Specifically, a pixel value $Y_{Prev}$ of the estimated luminance image as a luminance distribution of the estimated superimposed image is calculated using formula 8.

$$Y_{(prev)n-1} = Y_{print} \cdot \Sigma_{k=0}^{n-1} Y_{Pk} \qquad \text{Formula 8}$$

As described above, the XYZ values of the superimposed image can be expressed by a product of the XYZ values of the projection target image and the XYZ values of the projected image. Herein, a luminance value of the superimposed image is estimated by calculating a product of the value Y of each pixel in the printed image and the value Y of each pixel in the projected image. Further, the third acquisition unit 207 displays the calculated estimated luminance image on the window 506.

In step S812, the third acquisition unit 207 acquires brightness of the projector of the type specified in the n-th projector specification box 504, an aspect ratio of the projection area, a projectable minimum image size, and a projectable maximum image size from the HDD 114.

In step S813, the third acquisition unit 207 acquires, for the n-th projector, a longitudinal size Hp in a unit of "m", a lateral size $W_{Pn}$ in a unit of "m", and a projection position ($x_{Pn}$, $y_{Pn}$) of the projection area specified by the user using the window 506.

In step S814, the third acquisition unit 207 calculates the maximum luminance value $Cd_{Pn}$ in a unit of "cd/m²" acquired from the projection executed by the n-th projector using formula 5.

In step S815, similar to the processing in step S409 in the first exemplary embodiment, the third acquisition unit 207 calculates the pixel value $Y_P$ of the projected image corresponding to the n-th projector. Then, based on formula 9, the third acquisition unit 207 calculates the pixel value $Y_{Prev}$ of the estimated luminance image as a luminance distribution of the predicted superimposed image.

$$Y_{(prev)n} = Y_{print} \cdot \Sigma_{k=0}^{n} Y_{Pk} \qquad \text{Formula 9}$$

Further, the third acquisition unit 207 displays the calculated estimated luminance image on the window 506. Through the display processing executed in steps S811 and S815, the user can compare the superimposed image acquired from the projection executed by the projectors up to the n−1 th projector and the superimposed image acquired from the projection executed by the projectors up to the n-th projector to confirm change in the luminance FIGS. 8A and 8B are schematic diagrams illustrating examples of the area specification window 506 displayed on the GUI in the present exemplary embodiment. In the examples in FIGS. 8A and 8B, for simplification, it is assumed that only one projector is used, and that overall projection is not executed. FIG. 8A illustrates a state where the projection area having a relatively small size is specified in a periphery of the maximum luminance portion 1001 of the image. FIG. 8B illustrates a state where the projection area is specified to cover most of the object in the printed image. It can be understood that the area specified in FIG. 8A is displayed much brighter than the area specified in FIG. 8B. While the display processing in steps S811 and S815 has been executed on the window 506, images may be displayed on different windows, so that the user can compare the images easily.

In step S816, the third acquisition unit 207 determines whether the area determined by the information acquired in step S813 is determined as the projection area where projection is to be executed by the n-th projector. Specifically, the third acquisition unit 207 causes the display 116 to display the GUI which allows the user to specify whether the area determined by the information acquired in step S813 is determined as the projection area where projection is to be executed by the n-th projector, and receives input information from the user. The third acquisition unit 207 executes the determination based on the information input by the user. If the area determined by the information acquired in step S813 is determined as the projection area where projection is to be executed by the n-th projector (YES in step S816), the processing proceeds to step S409. If the area determined by the information acquired in step S813 is not determined as the projection area where projection is to be executed by the n-th projector (NO in step S816), the processing returns to step S813.

<Effect of Second Exemplary Embodiment>

As described above, the information processing apparatus according to the present exemplary embodiment estimates and displays the luminance distribution of the superimposed image generated by superimposing the images based on the projection area specified by the user. This allows the user to easily confirm change in the superimposed image caused by the additional projector. Accordingly, the user can easily find out a position in the projection target image where partial projection should be executed.

In the above-described exemplary embodiment, a position in the projection target image, where partial projection should be executed, has been presented to the user by displaying the image. In the third exemplary embodiment, based on a projection area specified by the user, an evaluation value indicating to what extent the target is achieved is presented to the user. A configuration of the information processing apparatus in the present exemplary embodiment is similar to that of the first exemplary embodiment, so that description thereof will be omitted. Hereinafter, a configuration of the present exemplary embodiment different from that of the first exemplary embodiment will be mainly described. In addition, the same reference numeral is assigned to the configuration similar to that of the first exemplary embodiment.

<Processing Executed by Information Processing Apparatus 1>

Hereinafter, a flow of processing executed by the information processing apparatus 1 according to the present exemplary embodiment will be described with reference to the flowchart in FIG. 7C. The processing in steps S811 to S814 and S816 in the present exemplary embodiment is similar to the processing in the second exemplary embodiment, so that only the processing in step S815' of the present exemplary embodiment will be described.

In step S815', the third acquisition unit 207 calculates a target achievement rate $R_{Accum}$ serving as an index indicating to what extent the superimposed images projected by the projectors up to the n-th projector realizes the target projected image, and displays the calculated target achievement rate $R_{Accum}$ on the GUI. The target achievement rate $R_{Accum}$ is calculated based on the following formula 10.

$$R_{Accum} = \Sigma_{i,j} \Sigma_{k=0}^{n} Y_{Pk}(i,j) / \Sigma_{i,j} Y_{TProject}(i,j) \qquad \text{Formula 10}$$

Herein, the target achievement rate $R_{Accum}$ is a ratio of a sum of all of pixel values of the projected images projected by the projectors up to the n-th projector and a sum of all of the pixel values of the target projected image.

Further, the third acquisition unit 207 calculates a contribution rate $R_{Pn}$ indicating to what extent the n-th projector alone contributes with respect to the target, and displays the calculated contribution rate $R_{Pn}$ on the GUI. The contribution rate $R_{Pn}$ is calculated based on the following formula 11.

$$R_{Pn} = \Sigma_{i,j} Y_{Pn}(i,j) / \Sigma_{i,j} Y_{TProject}(i,j) \qquad \text{Formula 11}$$

Herein, the contribution rate $R_{Pn}$ is a ratio of a sum of all of the pixel values of the projected image projected by the n-th projector and a sum of all of the pixel values of the target projected image. FIG. 8C illustrates an example of an area specification window for displaying the target achievement rate and the contribution rate. In the present exemplary embodiment, the luminance ratio is displayed as the evaluation value. However, for example, a color difference in the L*a*b* space may be displayed as the evaluation value.

<Effect of Third Exemplary Embodiment>

As described above, the information processing apparatus according to the present exemplary embodiment presents, to the user, the evaluation value indicating to what extent the target is achieved by the projector to which the projection area has been specified. This allows the user to easily determine a position in the projection target image where partial projection should be executed.

In the third exemplary embodiment, an evaluation value indicating to what extent the target is achieved is calculated and presented to the user. In the fourth exemplary embodiment, candidates of the projection area is calculated by using the above-described evaluation value, and the calculated candidates are presented to the user. A configuration of the information processing apparatus in the present exemplary embodiment is similar to that of the first exemplary embodiment, so that description thereof will be omitted. Hereinafter, a configuration of the present exemplary embodiment different from that of the first exemplary embodiment will be mainly described. In addition, the same reference numeral is assigned to the configuration similar to that of the first exemplary embodiment.

<Processing Executed by Information Processing Apparatus 1>

Hereinafter, a flow of processing executed by the information processing apparatus 1 according to the present exemplary embodiment will be described with reference to the flowchart in FIG. 7D. The processing in steps S401 to S407 and S409 is similar to the processing in steps S401 to S407 and S409 in the first exemplary embodiment, so that description thereof will be omitted. FIG. 7D is a flowchart illustrating a flow of processing in step S408.

In step S821, the third acquisition unit 207 acquires brightness of a projector of a type specified in the n-th projector specification box 504, an aspect ratio of the projection area, a projectable minimum image size, and a projectable maximum image size from the HDD 114.

In step S822, the third acquisition unit 207 determines a candidate of the projection area from among a plurality of areas determined by the aspect ratio and the projectable image size of the projection area. Specifically, based on formula 11, a contribution rate $R_{Pn}$ ($x_{Pn}$, $y_{Pn}$, $W_{Pn}$) is respectively calculated with respect to all of candidates of the coordinate ($x_{Pn}$, $y_{Pn}$) representing the projection position of the projector and all of candidates of the lateral size $W_{Pn}$ as one of the variables representing the projection size of the projector. Further, the third acquisition unit 207 stores the variables ($x_{Pn}$, $y_{Pn}$, $W_{Pn}$) having the contribution rate $R_{Pn}$ falling within a range up to the m-th contribution rate $R_{Pn}$ from the top. Herein, "m" is a predetermined constant.

In step S823, the third acquisition unit 207 presents m-pieces of candidates ($x_{Pn}$, $y_{Pn}$, $W_{Pn}$) stored in step S822 to the user through list display. Further, the third acquisition unit 207 determines the projection area based on a selection instruction received from the user.

<Effect of Fourth Exemplary Embodiment>

As described above, the information processing apparatus according to the present exemplary embodiment calculates, based on the evaluation value indicating to what extent the target is achieved by the projector to which the projection area is specified, candidates of the projection area and presents the candidates to the user. This allows the user to easily determine a position in the projection target image where partial projection should be executed.

Other Exemplary Embodiments

In the above-described exemplary embodiments, a printed image serves as a projection target image for projecting images by the projector group 112 to generate a superimposed image. However, the projection target image is not limited to the above-described example. For example, the projection target image may be also an image projected by a projector. Further, the projection target image may be an image displayed on a display.

Further, in the above-described exemplary embodiment, the input device 110 and the display 116 are described as separate devices. However, a touch panel display integrally configured of the input device 110 and the display 116 may be used in place of the separate devices.

Further, in the above-described exemplary embodiment, a system in which the information processing apparatus 1, the printer 111, and the projector group 112 are provided as separate devices has been employed. However, the system configuration is not limited to the above-described example. For example, the information processing apparatus 1 may be included in the printer 111 or the projector group 112.

Further, in the above-described exemplary embodiments, a superimposed image is generated by projecting the projected images projected by the projectors of the projector group 112 on the printed image formed by the printer 111. However, a method of generating the superimposed image is not limited to the above-described example. For example, the display 116 may be used instead of the projectors of the projector group 112. In this case, the printed image is acquired by forming an image on a transparent recording medium, and the display 116 is arranged on a back side of the printed image.

Further, in the above-described exemplary embodiments, an ink-jet printer has been described as an example of the printer 111. However, the printer 111 is not limited to the above-described example. For example, the printer 111 may be an electrophotographic printer that uses toner as a recording material.

Further, in step S402 of the above-described exemplary embodiments, RGB values are converted into XYZ values by using a conversion matrix expressed by formula 1. However, the conversion may be executed by using a look-up table (LUT) in which a correspondence relationship between the RGB values and the XYZ values is described.

Further, the target image and the printed image in the above-described exemplary embodiments are described as the images consisting of pixels each of which has RGB values defined in the sRGB space as the color information. However, the target image and the printed image are not limited to the above-described examples. For example, the target image and the printed image may be images consisting of pixels each of which has RGB values defined in the Adobe RGB space, or may be images consisting of pixels each of which has L*a*b* values defined in the L*a*b* space. In this case, an LUT or a conversion matrix for converting the pixel values of each pixel into XYZ values is created previously.

Further, the target image and the printed image in the above-described exemplary embodiments are the same images. However, the target image and the printed image do not have to be the same as long as the same contents are reproduced thereby. For example, in order to improve the appearance of the printed image alone, saturation or sharpness of the target image may be emphasized. In addition, in a case where the resolution or the size of the target image is different from that of the printed image, processing for matching the resolution or the size, e.g., resolution conversion processing, is executed additionally.

Further, in step S406 of the above-described exemplary embodiment, while the XYZ values lacking for achieving the target image are calculated based on the assumption that the ambient light is ignorable, brightness of the ambient light may be taken into consideration. For example, brightness of the ambient light can be measured previously, and calculation may be executed using formula 4 based on the assumption that the image is projected on the entire portion of the printed image with brightness of the ambient light.

Further, in step S407 of the above-described exemplary embodiment, although a state where all of the values $XYZ_{Diff}$ of respective pixels become 0 or less in step S406 serves as a condition for ending the processing, the condition for ending the processing is not limited to the above-described example. For example, a state where all of the values $XYZ_{Diff}$ of respective pixels become a predetermined threshold value or less may be determined as a condition for ending the processing. Alternatively, a state where an ending instruction is received from a user via the GUI can be used as a condition for ending the processing. Further, the number of available projectors may be previously stored in a storage device such as the HDD 114, and a state where the number n−1 of used projectors exceeds that previously stored number can be used as a condition for ending the processing.

In the above-described exemplary embodiments, the output projected image data is output to the corresponding projector. Further, processing for outputting printed image data to the printer 111 may be executed additionally. For example, the printed image data can be output to the printer 111 after converting the pixel values of the printed image into a recording amount of ink mounted on the printer 111. Further, the printed image data may be output to the printer 111 after executing halftone processing and path decomposition processing.

Further, in order to specify the area where projection should be executed, the specification unit 206 of the above-described exemplary embodiment specifies an area where luminance is not sufficient. However, the area where projection should be executed may be specified by another method. For example, an image acquired by capturing a printed image formed on a recording medium can be displayed on the display 116, and the user can be allowed to specify the area where projection is to be executed. The area where projection should be executed is specified by receiving the information indicating the projection area specified by the user.

Further, in the above-described exemplary embodiments, the projection area is repeatedly specified by the user or the projection area is repeatedly determined according to the evaluation value until the condition is satisfied in step S407. However, a method of determining a plurality of projection areas is not limited to the above-described example. For example, the projection sizes $H_{Pn}$ and $W_{Pn}$ of the n-th projector can be previously set by formula 12.

$$H_{Pn} = H_{Pn-1}/k$$

$$W_{Pn} = W_{Pn-1}/k \qquad \text{Formula 12}$$

Herein, "k" represents an optional value, and the n-th projector can reproduce brightness $k^2$-times brighter than the brightness of the n−1th projector. Further, projection positions of respective projectors can be previously set by making the brightest point or the gravity center of the pixel value $Y_{TProject}(x, y)$ of the target projected image as a reference. For example, the center of the projection area of the projector is set as the brightest point of the target projected image. In a case where the projection area goes beyond the printed matter, the projection position is shifted toward the center of the printed material, so that the projection area is placed within the printing area. In this way, the projection area can be determined to efficiently cover the brighter area.

Further, in the above-described exemplary embodiments, a projection area is determined, then projected image data representing the projected image is generated based on the determined projection area. However, the projected image data may be generated previously. In this case, based on the projected image data generated previously, the information processing apparatus presents a position in the projection target image where partial projection should be executed to the user.

Further, in the fourth exemplary embodiment, candidates of the projection area having the contribution rates falling within a range up to the m-th contribution rate have been presented to the user. However, an area having the highest contribution rate may be determined as the projection area.

Furthermore, specifically, in the fourth exemplary embodiment, the contribution rate has been calculated with respect to all of the areas determined by the coordinate ($x_{Pn}$, $y_{Pn}$) and the lateral size $W_{Pn}$. However, for the sake of simplification of the processing, the contribution rate may be calculated at each of predetermined discrete area. For example, the printed image to be a projection target can be vertically and horizontally divided by 16, and the evaluation value may be calculated with respect to the areas of 16-by-16 pieces. Further, an area regarded as a candidate may be specified from the areas having high evaluation values and its proximal areas.

Further, in the fourth exemplary embodiment, candidates of the projection area are presented to the user through list display. Further, the candidates of the projection area can be presented to the user by using a three-dimensional heat map taking respective variables as axes thereof.

Further, in the fourth exemplary embodiment, candidates of the projection area has been specified according to the specified projector type. However, a projector of a suitable type may be selected by treating a plurality of usable projector types as variables. In this case, in addition to the above-described target achievement rate and the contribution rate, cost of using the corresponding projector may be used as the evaluation value.

Further, in a case where an area with sufficient luminance is included in the projection area, maladjustment of the black level occurs because an amount of light cannot be reduced to 0. In order to suppress the maladjustment of the black level, the pixel values of the area with maladjustment of the black level may be subtracted from the pixel values of the superimposed area of the projected image of another projector. Further, maladjustment of the black level may be suppressed by correcting the pixel values of the printed image.

According to the present disclosure, when an image is to be projected on a partial area of a projection target image, an area in the projection target image where partial projection should be executed can be determined.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry (e.g., central processing unit (CPU), micro processing unit (MPU)), or a combination thereof, and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-100158, filed May 25, 2018, which is hereby incorporated by reference herein in its entirety.

What is claimed is:

1. An information processing apparatus comprising:
at least one memory and at least one processor which function as:
an acquisition unit configured to acquire image data representing an image generated by projecting a first image on a part of a second image using at least one projection apparatus; and
a control unit configured to control a presentation unit to present, to a user, an area in the second image where the first image should be projected by the at least one projection apparatus based on the image data,
wherein the presentation unit is a display unit configured to display an image,
wherein the control unit displays a target image to be reproduced by superimposing the first image on the second image and the area corresponding to the first image in the target area on the display unit, and
wherein the control unit controls the display unit to emphasize and display an area in the target image where a target luminance is not achieved on the second image.

2. The information processing apparatus according to claim 1, further comprising a determination unit configured to determine an area where the first image is projected by the at least one projection apparatus based on information for specifying an area including the area where the first image should be projected.

3. The information processing apparatus according to claim 2, wherein the information is information input by a user via a user interface.

4. The information processing apparatus according to claim 1, wherein the control unit controls the display unit to hatch and display the area in the target image where a target luminance is not achieved on the second image.

5. The information processing apparatus according to claim 1, wherein the control unit controls the display unit to blink and display the area in the target image where a target luminance is not achieved on the second image.

6. An information processing apparatus comprising:
at least one memory and at least one processor which function as:
an acquisition unit configured to acquire image data representing an image generated by projecting a first image on a part of a second image using at least one projection apparatus; and
a control unit configured to control a presentation unit to present, to a user, an area in the second image where the first image should be projected by the at least one projection apparatus based on the image data,
wherein the area where the first image should be projected is an area in the second image where target luminance is not achieved.

7. The information processing apparatus according to claim 1,
wherein the acquisition unit further acquires information indicating a usable projector type, and
wherein the control unit further controls the presentation unit based on the projector type.

8. The information processing apparatus according to claim 7, further comprising a selection unit configured to select a projector for projecting the first image based on selection information indicating a projector selected by the selection unit, the selection information indicating an area in the second image where target luminance is not achieved and the information indicating the usable projector type,
wherein the control unit controls the presentation unit based on the selection information.

9. The information processing apparatus according to claim 8, wherein the selection information is information indicating brightness capable of being output from the projector, an aspect ratio of an image output from the projector, and an image size capable of being output from the projector.

10. The information processing apparatus according to claim 1, wherein the control unit displays a superimposed image generated by superimposing the second image and the first image on the display unit.

11. The information processing apparatus according to claim 1, further comprising a calculation unit configured to calculate an evaluation value indicating to what extent a target luminance value has been achieved by a luminance value of the first image;
wherein the control unit displays the evaluation value on the display unit.

12. The information processing apparatus according to claim 1,
wherein the acquisition unit further acquires image data representing the second image, and
wherein the information processing apparatus further includes a specification unit configured to specify an area in the second image where target luminance is not achieved based on the image data acquired by the acquisition unit.

13. The information processing apparatus according to claim 12, wherein the control unit controls the presentation unit to present, to a user, an area specified by the specification unit as an area where the first image should be projected.

14. The information processing apparatus according to claim 1, further comprising the presentation unit configured to present an area where the first image should be projected.

15. An information processing apparatus comprising:
at least one memory and at least one processor which function as:

an acquisition unit configured to acquire image data representing an image generated by projecting a first image on a part of a second image using at least one projection apparatus, a determination unit configured to determine an area in the second image where the at least one projection apparatus projects the first image based on the image data, and display unit configured to display the area determined by the determination unit, wherein the display unit displays a target image to be reproduced by superimposing the first image on the second image and the area corresponding to the first image in the target image on the display unit, and wherein the display unit emphasizes and displays an area in the target image where a target luminance is not achieved on the second image.

16. An information processing method comprising:

acquiring image data representing an image generated by projecting a first image on a part of a second image through at least one projection apparatus, and controlling a presentation unit to present, to a user, an area in the second image where the first image should be projected by the at least one projection apparatus based on the image data, wherein the presentation unit is a display unit configured to display an image, wherein the controlling displays a target image to be reproduced by superimposing the first image on the second image and the area corresponding to the first image in the target area on the display unit, and wherein the controlling controls the display unit to emphasize and display an area in the target image where a target luminance is not achieved on the second image.

17. A non-transitory computer-readable storage medium storing instructions that, when executed by a computer, cause the computer to perform an information processing method comprising:

acquiring image data representing an image generated by projecting a first image on a part of a second image through at least one projection apparatus, and controlling a presentation unit to present, to a user, an area in the second image where the first image should be projected by the at least one projection apparatus based on the image data, wherein the presentation unit is a display unit configured to display an image, wherein the controlling displays a target image to be reproduced by superimposing the first image on the second image and the area corresponding to the first image in the target area on the display unit, and wherein the controlling controls the display unit to emphasize and display an area in the target image where a target luminance is not achieved on the second image.

\* \* \* \* \*